Aug. 26, 1930.   T. W. CASE   1,774,253
REPRODUCING SLIT
Filed Aug. 18, 1925

WITNESS
H. W. Hurst

INVENTOR
Theodore W. Case
BY Denison Thompson
ATTORNEYS

Patented Aug. 26, 1930

1,774,253

UNITED STATES PATENT OFFICE

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK

REPRODUCING SLIT

Application filed August 18, 1925. Serial No. 50,915.

This invention relates to a certain new and improved apparatus for reproducing the original sounds from a photographic record of light waves as varied in accordance with electrical variations corresponding to sound wave variations.

Moving talking picture films have been heretofore produced which embodied a consecutive series of pictures for producing a moving picture, the film having slots at its opposite edges for receiving the cogs or teeth on wheels of the machine for driving the film, and at one side of the consecutive series of pictures between the slotted edge portion of the film and the adjacent edge of the pictures there remains a narrow space upon which a photographic record of light wave variations corresponding to variations in sound waves has been photographed.

The photographic record corresponding to sound wave variations is from the standpoint of appearance in the form of a series of parallel lines or dark and light spaces extending at right angles to the longitudinal axis of the film as a result of the fact that the film is subjected to light wave variations through an extremely narrow slot in the camera, the slot being of proper length for taking a photographic representation upon the narrow space between the slots in one edge of the film and the adjacent edge of the series of pictures.

The object of this invention is to effect a more perfect, clear and distinct reproduction of the original sound waves from a photographic record of the character above described.

Other objects and advantages relate to the details of the apparatus and the method of reproducing the original sound waves, all as will more fully appear from the following description, taken in connection with the accompanying drawings, in which:—

Figure 1:
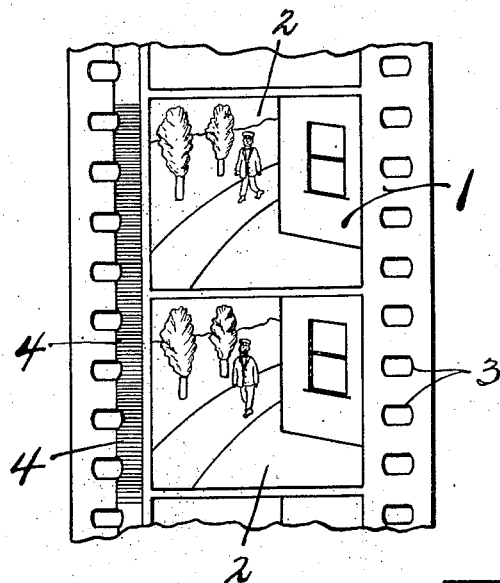
Figure 1 is a plan view of a portion of a talking moving picture film.
Figure 2:
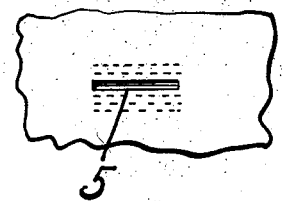
Figure 2 illustrates a slot thru which the talking picture may be taken.
Figure 3:
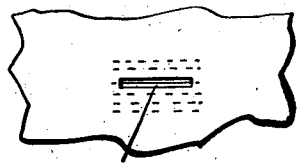
Figure 3 illustrates a slot thru which the film is exposed for reproduction of the original sound waves.

In Figure 1 the usual moving picture film 1 which is illustrated comprises a series of consecutive pictures 2, the film being formed at its opposite edges with the slots 3 for the reception of the teeth on the usual wheels provided for driving the film. At one side of the pictures 2 and between the slots 3 and the adjacent edge of the pictures, the photographic reproduction of light waves is illustrated in the form of lines 4 that extend substantially perpendicular to the longitudinal axis of the film. The length of these lines which constitute the photographic record depends entirely upon the length of the taking slit or slot 5, a suitable size for the taking slot being approximately .1 of an inch in length and .001 of an inch in width, and Figure 2 illustrates such a slot 5 and in dotted lines indicates the width of the photographic record of sound waves which is taken through the slot 5.

The usual reproducing apparatus has utilized a reproducing slot of the same length and width as the taking slot thru which the light waves were photographed, and it is found in the use of such an apparatus that the reproduction is not clear, distinct and perfect, and I have found that if the slot 6 in the reproducing apparatus be made of less length than the slot thru which the photographic record 4 was taken and is so arranged with respect to the photographic record that only the intermediate portions of the lines constituting such record are exposed through the slot 6, then a much more accurate, clear and perfect reproduction is obtained due to the fact that the imperfect and ragged ends of the lines constituting the record are not utilized in reproduction. but rather only the intermediate sharp, clear and substantially perfect portion of the photographic record are exposed through the reproducing slot.

Obviously, the reproducing slot 6 may be of various lengths so long as it is of less length than the taking slot 5 and is so arranged with respect to the photographic record that the ends of the lines constituting such record are not exposed through the slot.

Figure 4:
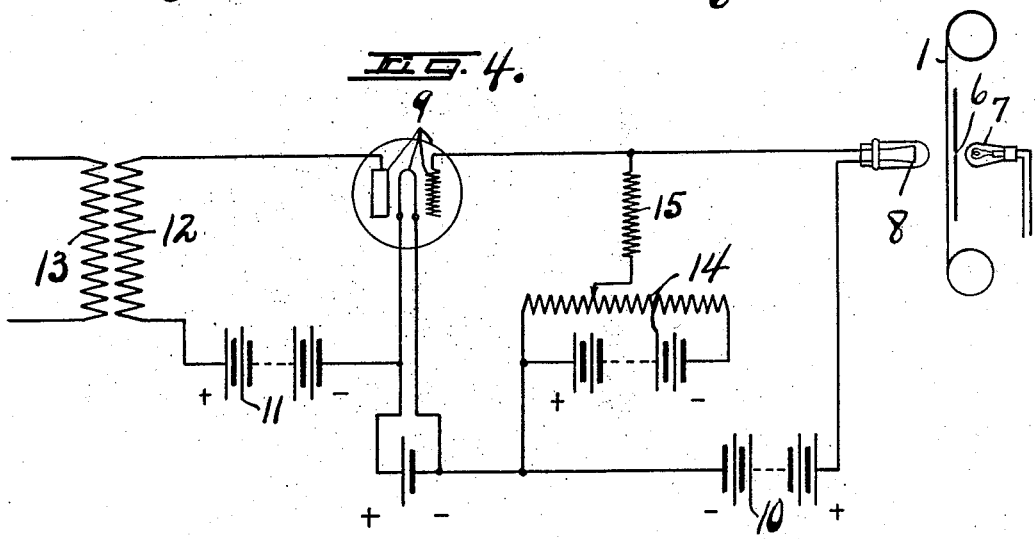
Figure 4 is a diagrammatic illustration of a portion of a reproducing apparatus.

In Figure 4 the film 1 is shown as moving past the reproducing slot 6, a source of light as lamp 7 being illustrated for directing rays through the slot 6 and through the photographic record 4 on to the light reactive cell 8 which may, as shown, for amplifying purposes, be connected in circuit, with the filament and grid of an audionic device 9, such circuit including a source of potential as the battery 10.

The output circuit of the device 9 may contain a source of potential 11 and the primary 12 of a transformer, the secondary 13 of which may be connected to other stages of amplification if desired, or translating devices such as phones may be substituted for the primary 12 if further amplification is unnecessary. Preferably a potentiometer 14 and a fixed resistance 15 are connected in shunt across the filament and grid so that the desired potential may be maintained upon the grid so as to obtain the most effective operation of the apparatus.

The essential feature of this invention is the combination with a photographic record of the character described and of a width corresponding to the length of the taking slit, of a reproducing slit through which the photographic record is exposed for the passage of light rays from a source to a light reactive cell, and which reproducing slit is of less length than the taking slit, and therefore of less length than the lines constituting the photographic record and arranged so as to expose only the intermediate portion of the lines constituting such record whereby a more perfect, clear and accurate reproduction is obtained.

I claim:

1. The method of reproducing sound waves from a photographic record of light waves varied in accordance with sound waves comprising moving the film with the sound record thereon past a narrow slit of a width substantially equal to the width of the taking slit but of a length somewhat less than the length of the taking slit so that only the intermediate portion of the record is exposed through said slit.

2. The method of reproducing sound waves from a photographic record of light waves varied in accordance with sound waves comprising moving the film with the sound record thereon past a narrow slit of a width substantially equal to the width of the taking slit but of a length somewhat less than the length of the taking slit so that an edge of the record is not exposed through said slit.

3. The method of reproducing sound waves from a photographic record of light waves varied in accordance with sound waves consisting of light and dark lines arranged transversely of the film, comprising moving the film with the sound record thereon past a narrow slit of a length less than the length of the lines constituting said record.

4. The method of reproducing sound waves from a photographic record of light waves varied in accordance with sound waves consisting of light and dark lines arranged transversely of the film, comprising moving the film with the sound record thereon past a narrow slit of a length less than the length of the lines constituting said record, and means for directing light rays through said slit and through the intermediate portion of the record only and upon a light reactive cell.

5. The method of reproducing sound waves from a photographic record of light waves varied in accordance with sound waves consisting of light and dark lines arranged transversely of the film comprising utilizing only the central portion of said lines of the record in reproduction.

6. The method of reproducing sound waves from a photographic record of light waves varied in accordance with sound waves consisting of light and dark lines arranged transversely of the film comprising exposing only the central portion of said lines to light rays in reproduction of sound waves.

7. An apparatus of the class described comprising the combination with a slit for taking sound pictures and which is of predetermined length and width of a reproducing apparatus including a slit of less length than the taking slit.

8. In an apparatus of the character described, the combination with a film having a sound record thereon of predetermined width, of an apparatus for reproducing sound waves from said record comprising a slit of less length than the width of the sound picture.

In witness whereof I have hereunto set my hand this 7th day of August, 1925.

THEODORE WILLARD CASE.